Feb. 22, 1966   B. LYMAN   3,236,517
SHEET HANDLING APPARATUS
Original Filed April 5, 1963   5 Sheets-Sheet 2
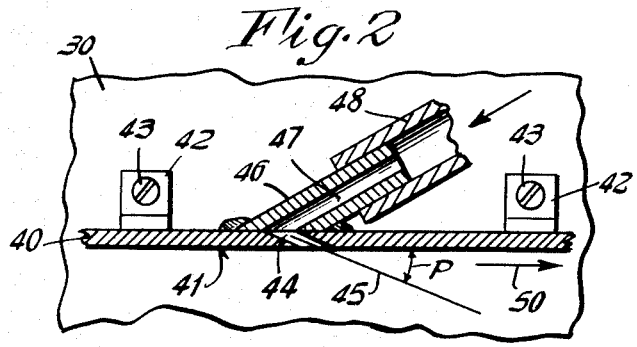
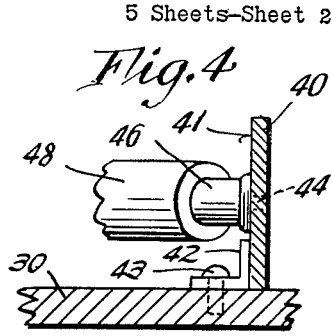
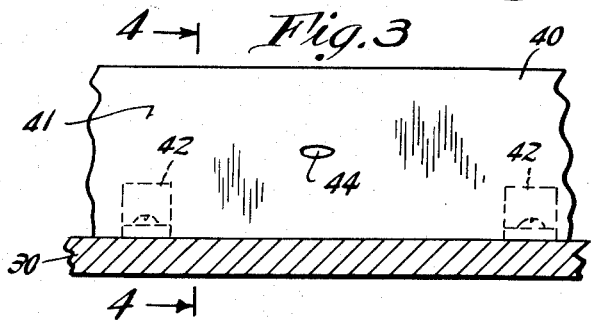
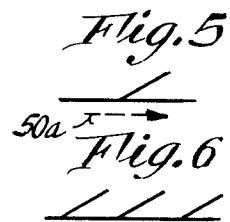
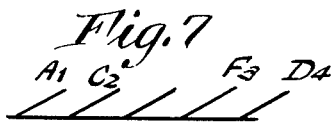
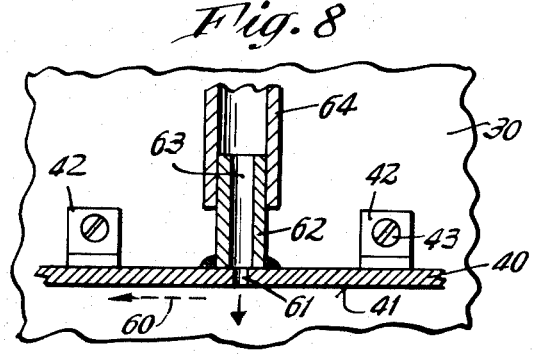
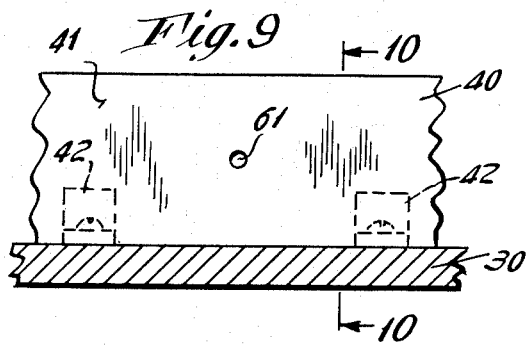
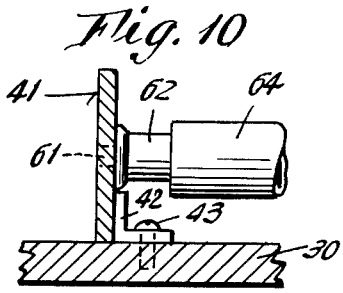
INVENTOR.
Brooks Lyman
BY
Albert W. Scribner
ATTORNEY

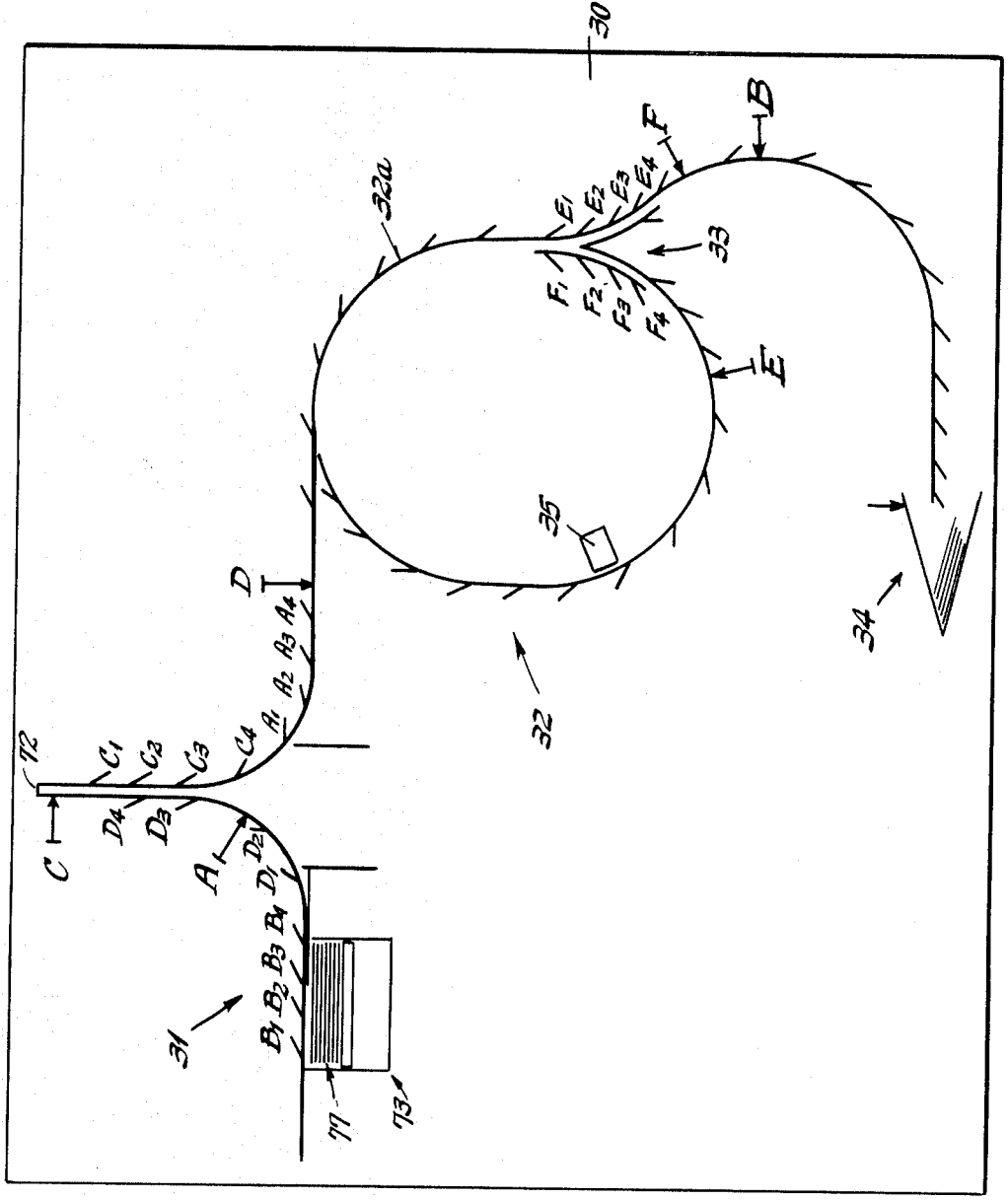

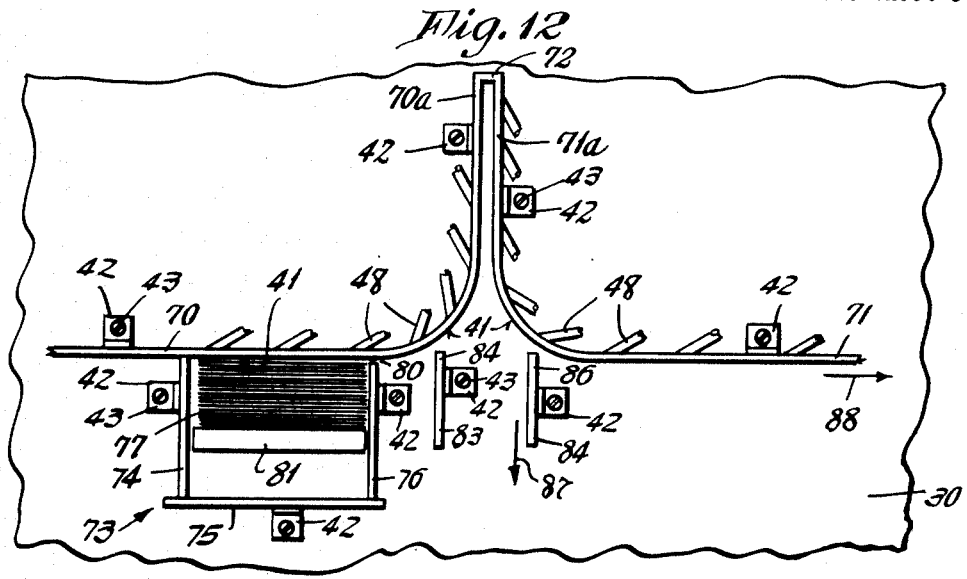
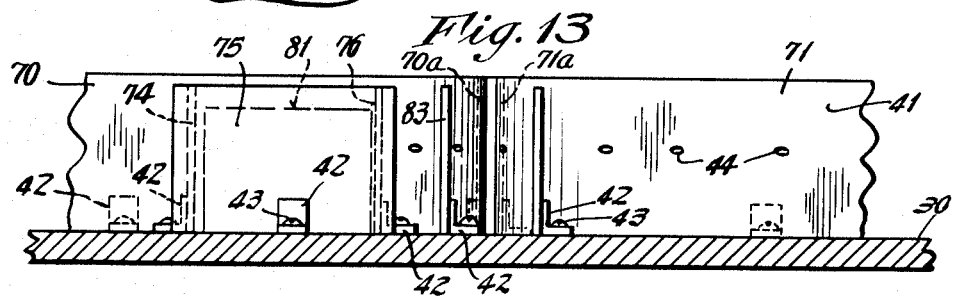
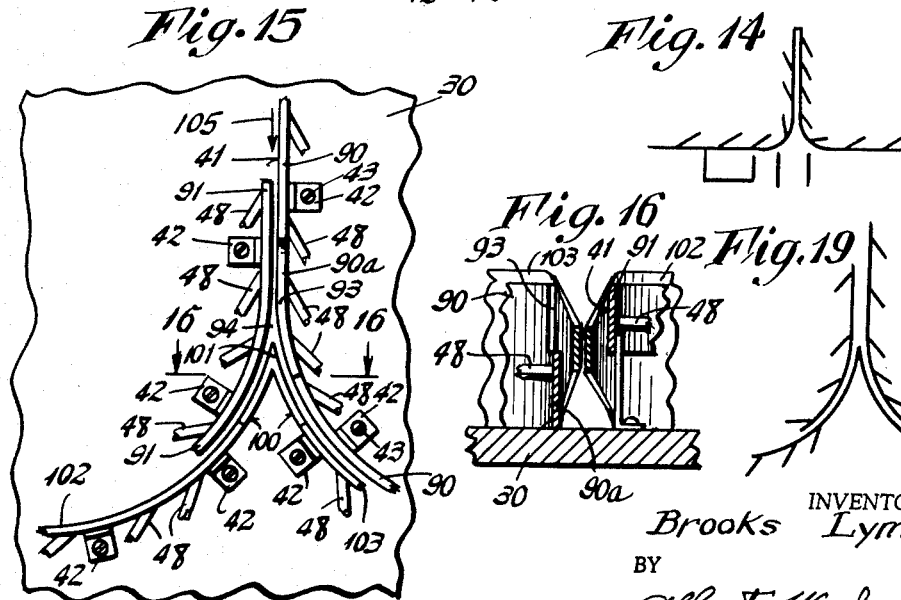

Feb. 22, 1966          B. LYMAN          3,236,517
SHEET HANDLING APPARATUS
Original Filed April 5, 1963          5 Sheets-Sheet 4
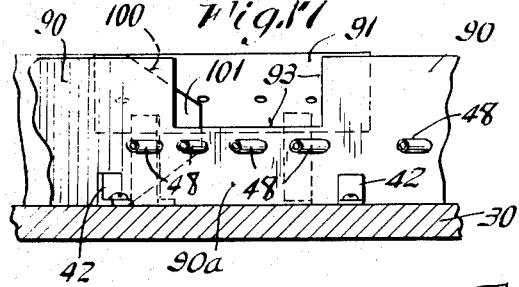
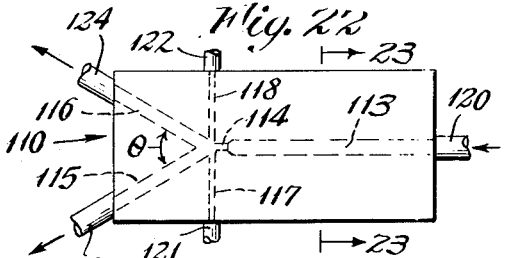
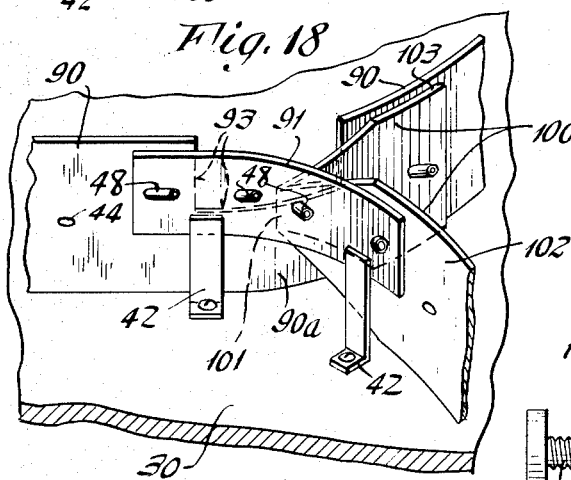
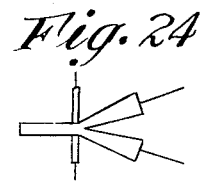
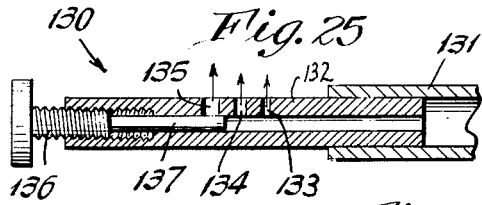
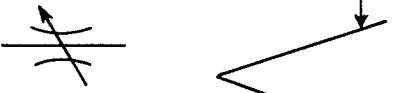
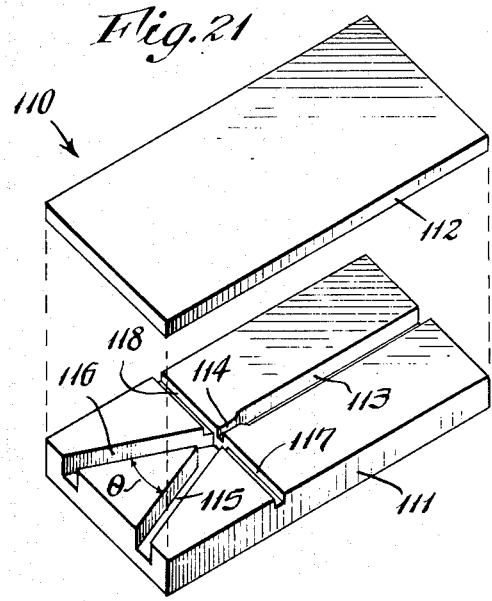
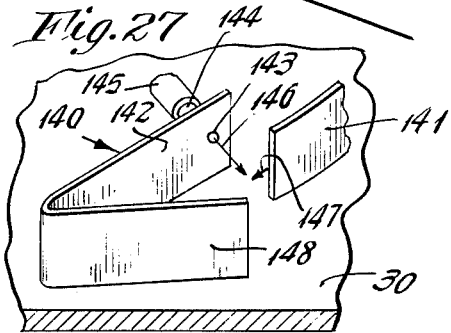
INVENTOR.
Brooks Lyman
BY
Albert W. Scribner
ATTORNEY

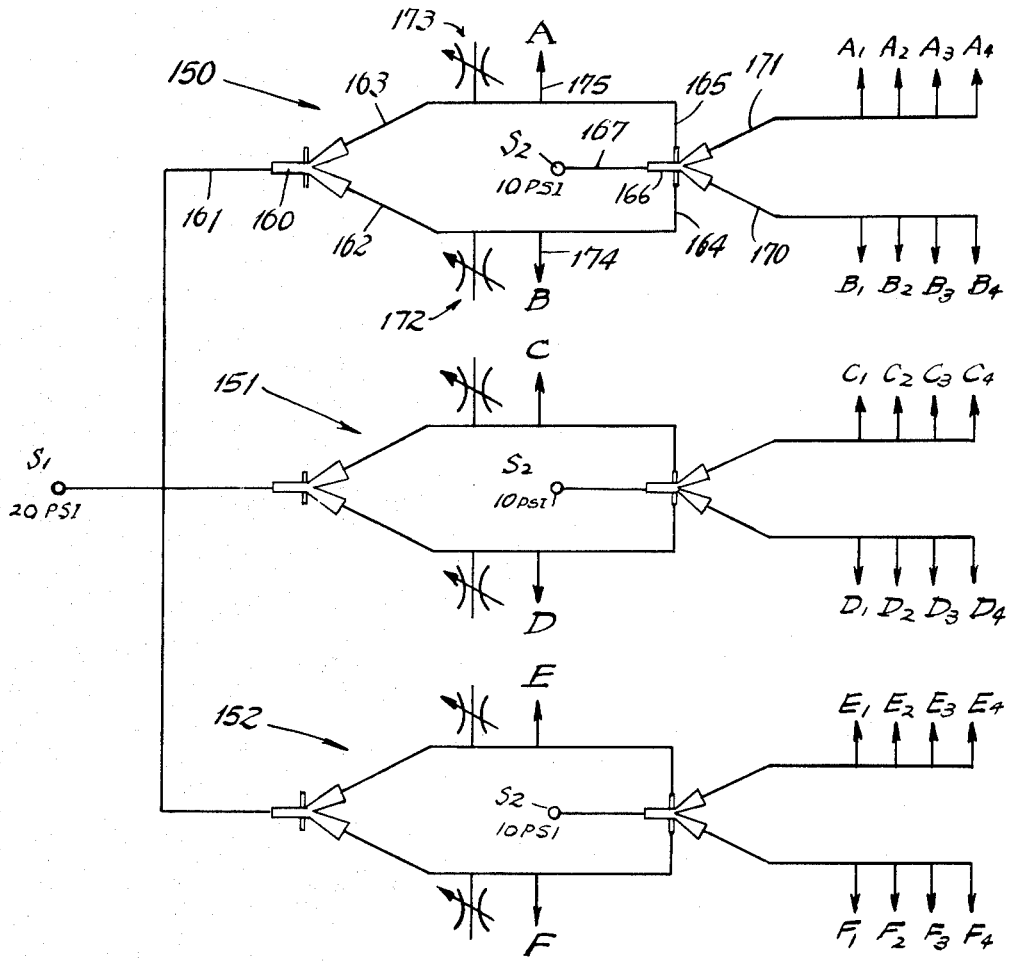

United States Patent Office 3,236,517
Patented Feb. 22, 1966

3,236,517
SHEET HANDLING APPARATUS
Brooks Lyman, R.R. 2, Box 7, Pound Ridge, N.Y.
Continuation of application Ser. No. 270,969, Apr. 5, 1963. This application Mar. 23, 1965, Ser. No. 445,837
18 Claims. (Cl. 271—5)

This application is a continuation of my copending application Number 270,969, filed April 5, 1963, for Sheet Handling Apparatus.

This invention relates to a novel pneumatic sheet handling apparatus. More particularly the invention relates to an improved document handling apparatus wherein aerodynamic means are used not only to separate, transport, sense, gate and stack documents but also to control the means that operate to perform these functions.

Conventional type document handling machines usually employ a large number of cooperating parts such as drive belts, vacuum drums, feed rollers, electromechanical elements and the like. As the number of such parts increases the cost and the possible incidence of malfunction of the machine tend to increase. The instant invention seeks to diminish the cost and the number of moving parts in a document handling system by utilizing aerodynamic techniques for applying to each document the forces necessary to obtain the desired motion and control of the documents. Air in motion is capable of transmitting forces to a sheet or document and the proper use and control of this capability can under certain conditions afford substantially all the dynamic forces required to perform and control a wide variety of document processing operations. This being the case a pure fluid document handling system may be set up wherein no moving mechanical parts are required and wherein the fluid medium itself constitutes substantially the only principal moving drive and control element in the system.

The primary object of the instant invention is to establish a network of individual but interrelated air streams which serve not only to apply separating, transporting, sensing, gating and/or arresting forces to documents that are to be physically handled but also to control the application of said forces.

Another object of the invention is to provide an aerodynamically operating feed and control arrangement for automatically manipulating a plurality of documents, said arrangement having essentially no moving parts.

Another object of the invention is to provide a novel document handling apparatus wherein a first group of air jets is provided for aerodynamically manipulating a plurality of documents and wherein a second group of air jets is provided and used for controlling the selective operation of the air jets in said first group.

Another object of the instant invention is to provide an improved document processing apparatus wherein aerodynamic forces are applied to a document so as to move the latter along a predetermined path, and wherein means are provided whereby said document when moving along said path may be aerodynamically sensed so as to thereby initiate a signal for controlling a subsequent document handling operation.

Another object of the invention is to provide a novel document handling system where each of a plurality of documents is aerodynamically transported along a fixed feed path that effectively defines a closed loop and wherein an aerodynamically operated gate is provided which is operable to cause said document to remain in or leave said closed loop feed path.

Another object of the instant invention is to provide a novel document separating means for an aerodynamic separating and feeding document handling device.

Another object of the invention is to provide an improved aerodynamically operated document sensing device whereby an air jet or stream is intercepted by a moving document and the resultant back pressure thereby produced in the air stream critically loads the output of a multi-stable pure fluid amplifier.

Another object of the invention is to provide a novel construction for an aerodynamically operated switching gate whereby a document may be selectively aerodynamically transported along either of two possible paths.

A further object of the invention is to provide a novel document handling apparatus having a multistable aerodynamically operating control means which controls an aerodynamically operating document feeding means and which is controlled by an aerodynamically operating document sensing device.

In the drawings:

FIG. 1 is a plan view that diagrammatically illustrates the instant document handling device.

FIG. 2 is a sectional plan view and illustrates a typical construction for the instant aerodynamic document transport means.

FIG. 3 is a front elevational view of the apparatus shown in FIG. 2.

FIG. 4 is a side elevational view taken along section line 4—4 of FIG. 3.

FIGS. 5, 6 and 7 show three symbols used to designate apparatus such as that shown in FIGS. 2-4 respectively.

FIG. 8 is a sectional plan view and illustrates a typical construction for an aerodynamic document sensing means.

FIG. 9 is a front elevational view of the apparatus shown in FIG. 8.

FIG. 10 is a side elevational view taken along section line 10—10 of FIG. 9.

FIG. 11 shows a symbol used to designate the apparatus of FIGS. 8–10.

FIG. 12 is a plan view of a typical construction for the instant aerodynamic document separating and feeding means.

FIG. 13 is a front elevational view of the apparatus shown in FIG. 12.

FIG. 14 shows a symbol used to designate the apparatus of FIGS. 12 and 13.

FIG. 15 is a plan view and illustrates a typical construction for the instant document gating apparatus.

FIG. 16 is a sectional elevational view taken along section line 16—16 of FIG. 15.

FIG. 17 is a right side elevational view of the apparatus shown in FIG. 15.

FIG. 18 is a perspective view of the apparatus shown in FIG. 15.

FIG. 19 shows a symbol used to designate the apparatus of FIGS. 15–18.

FIG. 20 shows a pneumatic circuit diagram for aerodynamically operating and controlling the system apparatus that is diagrammatically illustrated in FIG. 1.

FIG. 21 is an exploded perspective view showing a typical construction for a pure fluid amplifier that is used in the pneumatic circuit of FIG. 20.

FIG. 22 is a plan view of the assembled fluid amplifier.

FIG. 23 is a sectional view taken along section line 23—23 of FIG. 22.

FIG. 24 shows a symbol that is used to designate a fluid amplifier such as shown in FIG. 21.

FIG. 25 is a diametral section view showing a typical construction for a variable air vent which may be used in the pneumatic circuitry illustrated in FIG. 20.

FIG. 26 shows a symbol that is used to designate the apparatus of FIG. 25.

FIG. 27 is a perspective view showing a document receiving and stacking means.

FIG. 28 shows a symbol that is used to designate the apparatus of FIG. 27.

A general description of the instant aerodynamic document handling system will be made first in connection with the system layout shown in FIG. 1 and then a more detailed description of the component parts of the system will be made with reference to FIGS. 2–26. Referring to FIG. 1 there is shown a base 30 on which is mounted an areodynamic document separating and feeding device 31, a closed track or aerodynamic document circulating means 32, an aerodynamic document gating means 33 an a document receiving or stacking means 34. The document handling means 31–34 are interconnected by lengths of stationary document guide track which are provided with air jet means which serve to hold the documents on the guide track and to propel the same therealong. Several aerodynamic document sensing means such as illustrated at A, B, C, D, E and F are located along said track lengths. An aerodynamically operating control circuitry is provided for actuating and/or controlling the various document handling means 31–34 in a synchronized manner in order to effect the desired sequential transporting and manipulation of each successive document. A reading head 35 is operatively disposed along the looped portion of the document circulating track 32, said reading head being adapted to "read" a moving document and to accordingly control a downstream device such as a document sorter or the like.

A detailed discussion will now be made of the various components making up the instant aerodynamic document handling apparatus. Referring to FIGS. 2–4 a typical section of the document track or guide means is shown together with an aerodynamic drive means for propelling a document along said track section. On the base 30 there is mounted a track or guide member 40 having a smooth vertical guide surface 41 formed thereon which defines a portion of the length of the desired feed path. The guide member 40 is fixedly secured to the base 30 by any suitable fastening means such as brackets 42 and screws 43. A hole or bore 44 is formed through the wall of guide member 40 so that the hole axis 45 is disposed in a substantially horizontal plane and is oriented at an acute angle P with respect to the plane of the guide surface 41. Welded or otherwise secured to the rear side of the guide member 40 is an air fitting 46 which has a bore 47 that is operatively disposed so as to communicate with the said hole 44 and to which is connected a suitable air line or hose 48. When hose 48 is connected to a pressurized air supply a jet of air will emanate from bore 44 and such will be capable of aerodynamically propelling a document along the guide surface 41 in the direction indicated by arrow 50, FIG. 2. The application of Bernoulli's principle for propelling documents along a stationary guide surface is discussed in U.S. Patents 2,981,411 and 2,953,711, in British Patent 820,-036, and also in my Patent 3,136,539 for Sheet Handling, and reference to these sources may be made if further consideration and study of the aerodynamic document propulsion technique is desired. Suffice it here to state that the layer of air moving along the guide surface 41 will cause a document to be biased toward and "held" on said surface 41 by reason of a differential air pressure existing on the opposite sides of the document, and will also cause the document to be frictionally propelled along said surface 41 in the direction of flow of said layer of moving air.

FIG. 5 shows a symbol which represents the apparatus of FIGS. 2–4, the direction of document feed movement being indicated by the arrow 50a. FIG. 6 shows another symbol used in the schematic layout of FIG. 1 and illustrates a typical length of guide track that is provided with a plurality of successive air jet means each of which is similar to that described in connection with FIGS. 2–4. The longitudinal spacing between the successive air jet ports such as 44 is preferably less than the length of the shortest document to be transported. FIG. 7 shows a symbol that is similar to that of FIG. 6 but is further provided with designations A1, B2, etc. adjacent some of the air hose lines respectively. Such designations indicate which one of a plurality of numbered and available air supply sources a given air line is connected to.

FIGS. 8–10 illustrate an aerodynamically operating sensing means for sensing the presence of a document that is moving along a feed path as indicated by arrow 60. Here the guide member 40 is mounted and arranged on the base 30 in the manner described in connection with FIGS. 1–4 and is formed with a bore 61 whose axis is disposed substantially normal to the plane of the document guide surface 41. Welded or otherwise secured to the rear side of guide member is a horizontally disposed tubular fitting 62 which has a bore 63 that communicates with said bore 61 and to which is connected a suitable air line or hose 64. As will be apparent when hose 64 is connected to a pressurized air supply a jet of air will emanate from bore 61 and will cross the document feed path. When a document is propelled along the guide surface 41 so as to cross said jet of air the document is attracted toward the bore 61 causing a back pressure to be built up in line 64 which is higher than that existing when no document is blocking said bore 61. Under these conditions a pressure sensitive detecting means connected to line 64 will be able to sense the presence of a document moving past the open end of bore 61. The pressure sensitive detecting means will be described below. In FIG. 11 there is shown a symbol which represents the apparatus of FIGS. 8–10.

Referring to FIGS 12 and 13 there is shown an apparatus for serially separating documents from a stack and feeding the same to a transport track. Here a first length of track 70 and a second length of track 71, which are interconnected by a stop or document arresting section 72, are constructed and secured on base 30 in a manner similar to that illustrated in FIGS. 2–4. The tracks are provided with a plurality of air lines 48 and are formed with smooth vertically disposed document guide surfaces 41. The downstream portion 70a of track 70 and the upstream portion 71a of track 71 are closely spaced in substantially parallel relation as illustrated in FIG. 12. Mounted adjacent to the upstream portion of track 70 is a document stack supporting means or container 73 comprising three vertically disposed plates 74, 75 and 76 which are suitably fastened to the base 30 and which cooperatively define a three sided box type support means for a stack 77 of documents that are to be serially separated and transported along the guide track to downstream work stations. A small gap 80 exists between the inner end of the plate 76 and the adjacent portion of the guide surface 41 of the track so as to permit documents to be fed endwise (to the right as seen in FIG. 12) out of said document supporting means and along said surface 41 of track 70. A block or weight 81 is provided in the document container 73 to keep the documents in an upright condition. If desired a suitably arranged biasing spring may be provided between block 81 and plate 75 whereby the stacked documents may be yieldably fed toward the adjacent guide surface 41 as required by the progressive deletion of the stack 77. An upstanding separator plate 83 is mounted on base 30 by suitable fastening means and is disposed so that its inner end 84 is spaced a short distance from the adjacent portion of the guide surface 41 and intersects the plane of the next document to be fed from the document container 73. A second separator plate 85 is mounted on base 30 with its inner end 86 adjacent the curved portion of track 71. The purpose for this particular orientation of the plate 85 will be discussed below.

In operation air is applied through lines 48 to track 70. The leading document in the stack 77 is thereby separated or extracted from the stack and propelled along the guide surface 41 out of container 73 around the arcuate portion of the track and finally into arresting engagement with said stop section 72. If more than one document is fed from the container 73 the extra will not follow the curved portion of track 70 but will partake of a substantially straight line trajectory and hence will be immediately arrested by the inner end 84 of the separator plate 83 and will be in a position to be fed along surface 41 on the next separating and feeding cycle. This separating action is similar to that described in my above-mentioned Patent Number 3,136,539. Should the separator plate 83 fail to arrest a double feed due to a natural curl in the paper or for any other reason the second downstream separator plate 85 will serve to intercept and separate such document or documents (as indicated by the arrow 87) when the latter moves along the curved portion of track 71. The document arrested by the stop section 72 is driven along the guide surface 41 of track 71 by suitably interrupting the air flow through lines 48 to track 70 and initiating air flow in lines 48 to the track 71 whereupon the document is fed out of the slot between the track portions 70a and 71a and along the track 71 as indicated by arrow 88 of FIG. 12. The timing and the means for producing this timing of the initiating and terminating air flow in the various lines 47 will be subsequently described in detail in connection with the circuit diagram of FIG. 20. The symbol shown in FIG. 14 represents the apparatus of FIGS. 12 and 13.

Referring to FIGS. 15–18 there is shown a gating arrangement whereby a document moving along a given feed path may be directed along either of two separate feed paths. Here divergent document guide tracks 90 and 91 are secured to the base 30 by any suitable fastening means. The plane of the initial upstream portion of track 91 is parallel to and closely spaced from the plane of the opposing portion of the track 90. The track 90 is partially cut away as indicated at 93, FIG. 18, in the region of the track throat or vertex 94, this cut away portion being opposite from the elevated guide surface 41 of track 91. The lower remaining track portion 90a is opposite to the gap between the lower edge of track 91 and the upper surface of the base 30. In this way the horizontally and vertically offset track 91 and track portion 90a present a minimum of laterally projected overlap of the track surfaces in the region of said vertex 94 as is best illustrated in FIG. 16. A plurality of air lines 48 are connected in the manner previously described along each of the tracks 90 and 91. A third V-shaped track or guide member 100 is provided having a tapering nose portion 101 disposed in said vertex 94 and two diverging lengths 102 and 103 which are disposed on the radially outer sides of the two respective arcuate document feed paths. A plurality of air lines 48 are connected in the described manner along the track lengths 102 and 103. In operation when a document is being aerodynamically transported along surface 41 of the main track or guide member 90 as indicated by arrow 105, FIG. 15, the document may be directed along either of two feed paths, i.e. along the surface of track 90 or along the surface of track 91 depending on which track is supplied with an air flow through its associated air lines 48. Whichever feed path is selected the document will move off the associated track and onto the track portion 102 or 103; it being understood the latter track portions are respectively laterally spaced a short distance for example 1/32 to 1/8 of an inch, away from the tracks 90 and 91. As noted above the tracks 90, 91 are horizontally and vertically offset from one another in the region of the vertex 94, this being done so as to give the document propelling air moving along a selected one of said track 90 or 91 an opportunity, if need be, to partially vent or exhaust into the region immediately surrounding said one track thereby avoiding any tendency to cause a pressure build up in the region of vertex 94 which might tend to cause an air overflow along the non-selected track 91 or 90. Thus any tendency to create an undesired secondary document propelling air flow along the non-selected track is minimized. The timing for controlling the air flow in the air lines 48 of FIGS. 15–18 will be discussed below in connection with FIGS. 1 and 20. In FIG. 19 there is shown a symbol which represents the apparatus of FIGS. 15–18.

FIG. 20 shows the pneumatic circut diagram for controlling the apparatus shown in FIG. 1. Before discussing the circuitry involved here an explanation of two aerodynamic control elements used in the circuit will be made in connection with FIGS. 21–24 and FIGS. 25, 26 respectively. In FIGS. 21–24 there is shown a bistable pure fluid amplifier 110 comprising a lower body portion 111 and an upper body portion 112, said body portions being cemented or otherwise secured together as illustrated in FIGS. 22 and 23. The lower body portion has an elongated main groove 113 formed therein which is provided with a nozzle-like restriction 114 and which divides symmetrically into two branch grooves 115 and 116 having an included angle $\theta$ therebetween. A coaxial pair of control grooves 117 and 118 are also formed in the lower body portion 111 so as to be substantially normal to the main groove 113 at a point just in front, i.e. to the right as seen in FIG. 22, of the junction of the branch grooves 115 and 116. Flexible air hose lines 120–124 inclusive are pneumatically coupled to the main groove, control grooves and the branch grooves respectively as shown in FIG. 22.

In operation the main line 120 is connected to a pressurized air source so that a jet of air flows through the nozzle-like restriction 114 and out through one or the other of the branch grooves 115, 116. Only one branch groove at a time will conduct the jet of air and that branch will continue to conduct until the air stream is made to shift to the other branch groove whereupon said other branch will continue to conduct until caused to change that state. The shifting of the operative condition or state of the bistable aerodynamic control element may be controlled by introducing an air pressure impulse or signal into the control lines 121 or 122. Alternate air pressure pulses in said control lines i.e. in one control line and then the other, will cause the amplifier to shift back and forth between its two operative stable conditions. A shift in the operational mode or state of the fluid amplifier may also be obtained by wholly or partially blocking that branch groove 115 or 116 that is conducting. Here pressure build up in the conducting branch groove caused by the above mentioned blocking will be operationally tolerated only up to a given pressure level above which the air is forced to exhaust through the other branch groove. Once the air stream establishes a flow through one of the branched grooves it will continue such until caused to change that condition by either of the two shifting techniques just described. The bistable amplifier used here may be similar to that shown and described in copending application Serial No. 204,206, filed June 21, 1962, for Fluid Flow Control Device. The symbol shown in FIG. 24 represents the apparatus of FIGS. 21–23.

In FIGS. 25 and 26 there is shown the other type of control element used in the circuit of FIG. 20. The loading or air venting control element 130 is adapted to partially block or inhibit to varying degrees the flow of air in an air line. Referring to FIG. 25 there is shown the end of an air conducting line 131 to which is fitted a tubular member 132 that has a plurality of air vent holes such as 133, 134 and 135 formed through the walls thereof. Threadedly engaged in the outer end of member 132 is an adjustable plug 136 having an inner stem 137 which is adapted to selectively cover and uncover the various air vent holes 133–135. As will be apparent the amount of air permitted to exhaust through said air vent holes may be adjustably determined by the setting of the plug 136. This loading of the line 131 may be used to obtain desired static pressure conditions in those parts of the circuit pneumatically communicating with the line 131. FIG. 26 shows a symbol that is used to represent the apparatus of FIG. 25.

FIG. 27 illustrates a document receiving and stacking means comprising a generally V-shaped member 140 mounted on the base 30 and disposed at a downstream end of the document track section 141. The leg portion 142 of the member 140 is formed with an aperture 143 which communicates with a suitable fitting 144 that is secured to member 140. A suitable air line 145 is connected to the fitting 144 so that a jet of air 146 may continually issue from aperture 143. In this type of arrangement as each document moves off the end of track section 141 as indicated by arrow 147 the jet of air emanating from aperture 143 will laterally bias the same into stacked condition against the inner surface of the leg 148 of the document stacking means 140. FIG. 28 shows a symbol that represents the apparatus of FIG. 27.

Turning now to a joint consideration of the layout of FIG. 1 and the circuit diagram of FIG. 20 an explanation of the composite structural and operational features of the instant document handling system will now be made. In FIG. 1 many of the air lines to the document rack are numbered so as to designate the pressurized air sources for those lines respectively; these sources being shown in the circuit diagram of FIG. 20. Those air lines in FIG. 1 that are not numbered may be assumed to be connected to a pressurized air source that continuously supplies air to and through such lines. There are six document detecting or sensing air jet means A, B, C, D, E and F provided along the document tracks at the points indicated in FIG. 1. The circuit diagram which shows the pneumatic connections between the various track air lines, the six fluid amplifiers and the six document sensing means comprises essentially three sections 150, 151 and 152 connected in parallel to a common air supply source S1. In that each of these circuit sections are similar an explanation of one thereof will suffice here. The circuit section 150 comprises a first fluid amplifier 160 having an inlet line 161 connected to the source S1 and two output lines 162 and 163 that are respectively connected to the control lines 164 and 165 of a second fluid amplifier 166. The control lines to amplifier 160 are left open. Amplifier 166 has an inlet line 167 connected to a second air source S2 and two output lines 170, 171 that are respectively connected to the various document track air lines A1–A4 and B1–B4 as indicated in FIGS. 1 and 20. Connected to the said output lines 162 and 163 respectively are two flow inhibiting elements 172 and 173 and two document sensing control lines 174 and 175; said control lines being respectively connected to document sensing means B and A shown in FIG. 1. In the operation of the circuit section 150 air in passing through the amplifier 160 will flow out through output line 162 or 163 depending on the particular condition in which the amplifier is operating. When air is flowing through line 163 it will be conducted through line 175 to the document sensing air jet means A. Air flow in line 163 will also cause the amplifier 166 to be operated so that air from source S2 flows through output line 170 of the amplifier. Here to loading or back pressure controlling element 173 is adjusted so that the back pressure normally present in the air line 163, when the latter is conducting, will be just below that required to cause a shift in the operational condition of the amplifier 160. Under these conditions an air flow will continue through line 175 and lines 170, B1, B2, B3 and B4. When a back pressure is created in line 175 due to a document being sensed by detecting means A the pressure in line 163 will exceed the level required to cause the amplifier to shift its operative condition and hence the amplifier 160 will shift to its other operative condition and such in turn will shift the condition of the amplifier 166 so that air now flows through the document detecting line 174 and the document track lines A1, A2, A3 and A4. Under these flow conditions the air venting element 172 is adjusted so that the air pressure in line 162 is just below that required to change the amplifier 160 operation back to its other state. When a document is sensed by detecting means B a back pressure in line 174 will be created and such will cause the pressure in line 162 to exceed that pressure level which will produce an operational shift in the amplifier 160 and hence the latter will shift back to its original state wherein air flow occurs in line 175 and lines B1, B2, B3 and B4. The other pneumatic circuit sections 151 and 152 are constructed and arranged and operate in a manner corresponding to that just described for section 150. The various document sensing means C, D, E and F and the other output lines are appropriately connected to the circuit sections 151 and 152 and the document track in manner indicated in FIGS. 1 and 20.

The various line connections to the document track and the overall operation of the document handling system will now be described with reference primarily to FIG. 1. The track air lines of FIG. 1 that are not numbered are connected to an air source which affords a continuous supply of air to said lines. A stack 77 of documents is placed in the container 73. The normal condition for the pneumatic circuit of FIG. 20 is such that the track air lines B1, B2, B3 and B4; D1, D2, D3 and D4; and F1, F2, F3 and F4 are conducting and the document detecting air jet means A, C and E are operating so as to be capable of sensing a document when the latter moves through the air jet issuing from said sensing means A, C, and E respectively. Under these conditions the leading document in the stack 77 will be drawn toward the track guide surface by air flow from lines B1, B2, B3 and B4 and will thereafter be aerodynamically transported as above described past the aerodynamic document sensing means A which will cause lines A1, A2, A3 and A4 to become conducting and lines B1, B2, B3 and B4 to become non-conducting; the doubles detecting means operating as previously described. Air lines D1, D2, D3 and D4 will still be conducting and will continue to cause the document to be transported along the feed track and into engagement with the track abutment or stop section 72. Just prior to such engagement the document will move past the aerodynamic document detecting means C which will cause air lines C1, C2, C3 and C4 to become conducting and lines D1, D2, D3 and D4 to become non-conducting whereupon the arrested document will be transported in a reversed direction away from the stop section 72 and along the downstream portion of the track or document guide means. When the document passes the aerodynamic detecting means D the track air lines C1, C2, C3 and C4 will become non-conducting and the air lines D1, D2, D3 and D4 will again become conducting. The document is then transported along the track by the continuously conducting air lines (not numbered in FIG. 1) to the document gating means 33. In that the air lines F1, F2, F3 and F4 are conducting the document will follow along the looped circulating portion 32 of the track. When the document passes the document sensing means E the air lines E1, E2, E3 and E4 will become conducting and lines F1, F2, F3 and F4 will become non-conducting so that when the document retravels along the portion 32a of the track and again enters the gating means 33 it will be transported along the other output track leg of said gating means. When the document passes the aerodynamic document sensing means F the track air lines F1, F2, F3 and F4 will become conducting and lines E1, E2, E3 and E4 will again become non-conducting preparatory for the next document to be received. When the document passes the aerodynamic sensing means B the air lines A1, A2, A3 and A4 will become non-conducting and lines B1, B2, B3 and B4 to the document separating and feeding means will become conducting so as to start the next document in the stack 77 on its transport movement during the next operative cycle of the apparatus. After passing the sensing means B the document will be transported to the stacking means 34 where it will be arrested and aerodynamically laterally biased into stacked condition against one leg of the stacking means as previously described thereby completing a first cycle of the machine. During the next operational cycle the next document will be transported through the apparatus in a manner similar to that described for the first document. In this manner each successive document in the supply stack 77 may be serially manipulated, processed and finally delivered to the document stacking means. As will be apparent there are substantially no moving parts to the instant document handling system except for the air and the documents themselves and as a result the initial costs of the instant apparatus will be very low and after initial timing there will be few if any maintenance adjustments required during the life of the machine.

Since many changes could be made in the embodiment of the invention as particularly described and shown herein without departing from the scope of the invention, it is intended that this embodiment be considered as exemplary and that the invention not be limited except as warranted by the following claims.

What is claimed is:
1. An aerodynamic sheet handling device, comprising:
  sheet holding means for supporting a plurality of sheets;
  a sheet guide track for guiding sheets along a predetermined feed path;
  sheet separating and feeding means for directing a plurality of air jets past said sheets for separating the successive individual lead sheets from the remaining sheets in said holding means and for feeding the separated sheets one at a time to said guide track;
  drive means for aerodynamically propelling a sheet along said feed path;
  sensing means including an air jet for aerodynamically sensing the presence of the leading edge of a sheet moving along said feed path; and
  an air pressure responsive valve means operated by said sensing means for controlling the operation of said sheet separating and feeding means.

2. An aerodynamic sheet handling device, comprising:
  guide means having an elongated guide formed thereon for guiding a sheet along a predetermined feed path;
  propulsion means for aerodynamically moving a sheet along said feed path;
  gating means coupled to said guide means and including air jets operable to direct a sheet that is moving along said feed path into and along either of two separate feed paths;
  sheet sensing means disposed along at least one of said separate feed paths at a point downstream from said gating means and including conduit means for directing a sensing jet of air across said one of said separate feed paths in order to sense the presence of the operative leading edge of a sheet that is moving along said one of said separate feed paths; and
  a fluid amplifier operated by said sensing means for controlling the operation of said propulsion means.

3. Apparatus as defined by claim 2, additionally comprising:
  a second sheet sensing means disposed along the other of said separate feed paths; and
  a second fluid amplifier operated by said second sheet sensing means for controlling an operative condition of said gating means.

4. An aerodynamic document handling apparatus, comprising:
  guide means having an elongated surface formed thereon for guiding documents along a predetermined feed path;
  a first air jet drive means for aerodynamically propelling a document along said surface;
  gating means coupled to said guide means to direct a document that is moving along said feed path into either of two separate feed paths;
  a second air jet drive means for aerodynamically propelling a document along one of said separate feed paths;
  a third air jet drive means for aerodynamically propelling a document along the other of said separate feed paths;
  document sensing means including an air jet disposed along said one of said separate feed paths for aerodynamically sensing the presence of the leading edge of a document moving along said one separate feed path; and
  air circuit means controlled by said sensing means and operable in one of its operative conditions to disable said second air jet drive means and to enable said third air jet drive means.

5. Apparatus as defined by claim 4, additionally comprising:
  a second document sensing means operatively disposed along said other separate feed path for aerodynamically sensing the presence of a document that is moving along said other separate feed path;
  said air conduit means also being controlled by said second sensing means so as to enable said second air jet drive means and to disable said third air jet drive means.

6. An aerodynamic document handling apparatus, comprising:
  guide means having a surface formed thereon for guiding documents along a predetermined feed path;
  a first drive means for areodynamically propelling a document along said surface;
  feeding means for aerodynamically feeding documents one at a time to an upstream portion of said surface;
  a first document sensing means for aerodynamically sensing the presence of a document moving along said surface;
  a first air circuit means controlled by said sensing means and aerodynamically operable to control one operative condition of said feeding means;
  gating means disposed adjacent a downstream portion of said surface and operable to direct a document into and along either of two separate feed paths;
  a second drive means for aerodynamically propelling documents along one of said separate feed paths;
  a third drive means for aerodynamically propelling documents along the other of said separate feed paths;
  a second document sensing means for aerodynamically sensing the presence of a document moving along said one of said separate feed paths;
  a third document sensing means for aerodynamically sensing the presence of a document moving along said other of said separate feed paths;
  a second air circuit means operated by said second and third document sensing means for aerodynamically controlling the operation of said second and third drive means; and
  a fourth document sensing means for aerodynamically sensing a document that has passed said second document sensing means;
  said first air circuit means being also controlled by said fourth document sensing means and aerodynamically operable to control another operative condition of said feeding means.

7. An aerodynamic document separating and feeding unit, comprising:
  document supporting means for supporting a stack of documents;
  a first guide means disposed adjacent the leading document in said stack and having a first guide surface formed thereon for guiding a document along a predetermined feed path, an intermediate portion of said path being arcuate;
  stop means disposed at the downstream end portion of said surface;
  a doubles prevention means operatively disposed adjacent said arcuate portion of said path and arranged so as to be intersected by the direction of movement of said leading document when the latter leaves said document supporting means;

a first drive means for aerodynamically separating said leading document from said stack and aerodynamically propelling the separated document along said feed path and into engagement with said stop means;

a first document sensing means disposed along said surface for aerodynamically sensing the presence of a document moving along said feed path;

a second guide means having a second guide surface formed thereon, said second guide surface having an upstream end portion disposed adjacent to and opposite the downstream end portion of said first guide surface for guiding a document along a second predetermined feed path;

a second drive means for aerodynamically propelling a document along said second guide surface;

a second document sensing means disposed along said second guide surface for aerodynamically sensing the presence of a document moving along said second feed path; and control means operated by said first document sensing means for establishing one operative condition of at least a portion of said first and second drive means, and operated by said second document sensing means for establishing another operative condition of at least a portion of said first and second drive means.

8. Apparatus as defined by claim 7 wherein said control means includes a fluid amplifier, and wherein said one condition at least a portion of said first drive means is disabled and at least a portion of said second drive means is enabled and wherein in said another operative condition at least a portion of said first drive means is enabled and at least a portion of said second drive means is disabled.

9. Apparatus as defined by claim 7 wherein said second drive means is arranged to aerodynamically propel a document along the upstream end portion of said second guide surface in a direction that is substantially opposite to the direction of the just completed movement of said document along the downstream end portion of said first guide surface, the trailing end of the document thus becoming the leading end thereof as the document moves from said first to said second guide surface.

10. An aerodynamic document gating device; comprising:

a first guide means having an elongated guide surface formed thereon which defines a first predetermined feed path;

a first drive means for aerodynamically propelling a document along said guide surface;

a second guide means having an elongated guide surface formed thereon for guiding a document along a second predetermined feed path, a portion of the second mentioned guide surface being disposed in a plane that is substantially parallel to the adjacent portion of the first mentioned guide surface, said portion of said second mentioned surface being cut away in the region directly opposite side first mentioned surface, and said adjacent portion of the first mentioned surface being cut away in the region directly opposite said second mentioned surface, said first and second mentioned surface portions thus being horizontally and vertically offset from one another so as to present a reduced amount of laterally projected overlap of said surface; and a second drive means for aerodynamically propelling a document along said second mentioned guide surface.

11. Apparatus as defined by claim 10, additionally comprising:

means for aerodynamically feeding documents to a point between said opposing portions of said first and second mentioned surfaces; and a third guide means disposed between the downstream portions of said first and second mentioned guide surfaces and having two document guide surfaces formed thereon which respectively face said first and second mentioned guide surface.

12. Apparatus as defined by claim 11, additionally comprising a third drive means for aerodynamically propelling a document along either of the guide surfaces of said third guide means.

13. In an aerodynamic sheet handling apparatus:

a sheet guide track having an elongated guide surface formed thereon;

a fluid amplifier having a pair of output lines;

air jet document sensing means pneumatically connected to one of said output lines and adapted to direct a jet of air across the path of a sheet that is moving along said guide surface;

means for pressure loading said one of said output lines to just less than the amplifier shift producing pressure level so that when a superimposed pressure change occurs in said one output line by reason of a sheet passing through said jet of air the said amplifier shift producing pressure level will be exceeded and said amplifier will be shifted from one to another operating condition; and air conduit means coupling the other of said output lines so as to control the movement of a sheet along said sheet guide track.

14. Apparatus as defined by claim 13 wherein said air conduit means includes a second fluid amplifier having two control lines which are respectively operatively coupled to said output lines of the first mentioned fluid amplifier.

15. An aerodynamic document handling and control system, comprising:

track means having an elongated guide surface formed thereon, said guide surface defining a predetermined feed path along which a document may be propelled;

aerodynamic transport means cooperating with said track means for aerodynamically propelling a document endwise along said predetermined feed path, said transport means including a plurality of air jets spaced along said guide surface;

an aerodynamic detecting means downstream from at least some of said air jets and cooperating with said track means for directing a document sensing jet of air across said predetermined feed path whereby when a document moving along said path passes through said sensing jet of air a pressure change is produced in said detecting means;

a fluid amplifier having at least one output line and at least one control line;

a first conduit means operatively coupling said fluid amplifier control line to said aerodynamic detecting means; and a second conduit means operatively connecting said fluid amplifier output line so as to control the operation of said aerodynamic document transport means.

16. In an aerodynamic sheet handling apparatus:

a first guide means having an elongated guide surface formed thereon for guiding sheets along a predetermined feed path;

a first sheet propulsion means directing a plurality of air jets spaced along said elongated guide surface for aerodynamically propelling sheets along said predetermined path;

a gating means coupled to said guide means whereby a sheet areodynamically propelled along said feed path may be directed into either of two gated paths;

said gating means including a second sheet guide means having an elongated guide surface formed thereon and effectively defining one of said gated paths;

a second sheet propulsion means for directing a plurality of air jets along said surface of said second guide means for aerodynamically propelling a sheet along said one gated path;

a third sheet guide means having an elongated guide surface formed thereon and effectively defining the other of said gated paths; and a third sheet propulsion means for directing a plurality of air jets along said surface of said third guide means for aerodynamically propelling a sheet along said other gated path;

said third guide means being looped back to said first guide means so that the elongated guide surface formed on said third guide means terminates very close to the guide surface of said first guide means and operationally blends the trajectory of motion of a sheet moving along said other gated path back into the first mentioned feed path at a point upstream from said gating means; and means for conducting air to said first, second and third document propulsion means.

17. In an aerodynamically operating sheet handling device:

a guide means having an elongated guide surface formed thereon for guiding a sheet along a predetermined feed path;

a first sheet propulsion means for directing a first set of air jets along an initial length of said guide surface for aerodynamically propelling a sheet along an initial length of said predetermined feed path;

a first valve control means for controlling the operation of said first set of air jets;

a second sheet propulsion means for directing a second set of air jets along an intermediate length of said guide surface for aerodynamically propelling said sheet along an intermediate length of said predetermined feed path;

a second valve control means for controlling the operation of said second set of air jets;

a first aerodynamic sensing means for directing a first jet of air across said feed path at a point between said initial and intermediate lengths of said feed path;

a second aerodynamic sheet sensing means for directing a second jet of air across said feed path at a point downstream from said intermediate length of said feed path; and conduit means coupling said first and second aerodynamic sheet sensing means to said first and second valve control means for disabling one of said sets of air jets when the other of said sets of air jets is enabled.

18. In an aerodynamically operating sheet gating device:

a first guide means having an elongated guide surface formed thereon for guiding a sheet along a first predetermined feed path;

a first sheet propulsion means for directing a plurality of air jets along said guide surface for propelling a sheet along said feed path, said air jets contacting one side of said sheet;

a second guide means having an elongated guide surface formed thereon for guiding a sheet along a second sheet feed path that diverges from said first predetermined feed path, the initial portion of said second guide means being substantially parallel to and closely spaced from said first guide means so that the said guide surfaces of the initial portion of second guide means and the adjacent portion of the guide surface on said first guide means face each other and cooperatively define an elongated throat through which a sheet may pass, said sheet in passing through said throat being capable of being biased in either lateral direction towards said guide surfaces;

a second sheet propulsion means for directing a plurality of air jets along the guide surface of said second guide means for aerodynamically propelling a sheet along said second sheet feed path, the last mentioned air jets contacting the other side of said sheet; and control valve means for controlling the selective operation of said first and second sheet propulsion means whereby when a sheet moves into said throat said sheet will be aerodynamically laterally biased toward and propelled along that selected guide surface which has its associated propulsion air jets operating thus causing the sheet to move along the selected one of said feed paths.

References Cited by the Examiner

UNITED STATES PATENTS

| 2,981,411 | 4/1961 | Azari | 271—27 X |
| 3,123,355 | 3/1964 | Lessig | 271—62 |
| 3,136,539 | 6/1964 | Lyman | 271—26 |
| 3,169,639 | 2/1965 | Bauer | 137—81.5 X |

M. HENSON WOOD, JR., *Primary Examiner.*